(12) United States Patent
Xiao et al.

(10) Patent No.: US 10,509,260 B2
(45) Date of Patent: Dec. 17, 2019

(54) DATA CENTER

(71) Applicant: Huawei Technologies Co., Ltd., Shenzhen (CN)

(72) Inventors: Xinhua Xiao, Shenzhen (CN); Xiao Andy Shen, Santa Clara, CA (US); Yan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/241,380

(22) Filed: Jan. 7, 2019

(65) Prior Publication Data

US 2019/0137816 A1 May 9, 2019

Related U.S. Application Data

(63) Continuation of application No. PCT/CN2017/080899, filed on Apr. 18, 2017.

(30) Foreign Application Priority Data

Aug. 22, 2016 (CN) .......................... 2016 1 0702520

(51) Int. Cl.
*G02F 1/13* (2006.01)
*G02B 6/27* (2006.01)
(Continued)

(52) U.S. Cl.
CPC ..... *G02F 1/133528* (2013.01); *G02B 6/2773* (2013.01); *G02F 1/0353* (2013.01);
(Continued)

(58) Field of Classification Search
CPC ............ G02B 6/2773; G02F 1/333258; G02F 1/0353; G02F 2001/133528;
(Continued)

(56) References Cited

U.S. PATENT DOCUMENTS

| 6,532,107 | B2 * | 3/2003 | Yamaguchi | ....... H01S 3/094003 359/341.3 |
| 6,845,117 | B2 * | 1/2005 | Wakisaka | .................. H01S 5/12 372/46.01 |

(Continued)

FOREIGN PATENT DOCUMENTS

| CN | 103441942 A | 12/2013 |
| CN | 104052618 A | 9/2014 |
| CN | 105099556 A | 11/2015 |

*Primary Examiner* — Akm E Ullah
(74) *Attorney, Agent, or Firm* — Slater Matsil, LLP

(57) ABSTRACT

A data center includes a wavelength source, a first optical component, a first communications device, and a second communications device. The wavelength source is configured to generate an N-wavelength laser beam. The first port of the first optical component is configured to receive an M-wavelength laser beam from the wavelength source. The second port of the first optical component is configured to send the M-wavelength laser beam to the first communications device. The M-wavelength laser beam includes at least a first-wavelength laser beam. The second port of the first optical component is further configured to receive a modulated first optical signal from the first communications device, the modulated first optical signal is obtained after the first communications device modulates a service signal onto the first-wavelength laser beam. The third port of the first optical component is configured to send the modulated first optical signal to the second communications device.

18 Claims, 11 Drawing Sheets

(51) Int. Cl.
  *G02F 1/1335* (2006.01)
  *G02F 1/035* (2006.01)
  *H04Q 11/00* (2006.01)

(52) U.S. Cl.
  CPC ..... *H04Q 11/0003* (2013.01); *H04Q 11/0005*
   (2013.01); *G02F 2001/13355* (2013.01); *G02F*
   *2001/133628* (2013.01); *H04Q 2011/0016*
   (2013.01); *H04Q 2011/0022* (2013.01)

(58) Field of Classification Search
  CPC ...... G02F 2001/13355; H04Q 11/0003; H04Q
   2011/0022; H04Q 11/0005
  USPC .......................................................... 385/14
  See application file for complete search history.

(56) References Cited

U.S. PATENT DOCUMENTS

| | | | |
|---|---|---|---|
| 8,039,778 B2* | 10/2011 | Kakui | B23K 26/03 |
| | | | 250/205 |
| 8,508,747 B2* | 8/2013 | Childers | G01B 11/18 |
| | | | 356/478 |
| 2004/0240505 A1* | 12/2004 | Yoshida | B82Y 20/00 |
| | | | 372/50.1 |
| 2009/0238218 A1* | 9/2009 | Yao | H01S 3/1308 |
| | | | 372/20 |
| 2011/0097083 A1 | 4/2011 | Barrett | |
| 2011/0199618 A1* | 8/2011 | Childers | G01B 11/18 |
| | | | 356/521 |
| 2014/0270764 A1 | 9/2014 | Decusatis et al. | |
| 2015/0189408 A1 | 7/2015 | Chen | |
| 2015/0312657 A1 | 10/2015 | Yan | |
| 2017/0141538 A1* | 5/2017 | Uchida | H01S 5/06837 |
| 2018/0231807 A1* | 8/2018 | Zheng | G02F 1/025 |
| 2018/0360299 A1* | 12/2018 | Kishima | G02B 27/1013 |

* cited by examiner

DATA CENTER

CROSS-REFERENCE TO RELATED APPLICATIONS

This application is a continuation of International Application No. PCT/CN2017/080899, filed on Apr. 18, 2017, which claims priority to Chinese Patent Application No. 201610702520.6, filed on Aug. 22, 2016. The disclosures of the aforementioned applications are hereby incorporated by reference in their entireties.

TECHNICAL FIELD

The present invention relates to the communications field, and in particular, to a data center.

BACKGROUND

A data center is equipment implementing centralization, sharing, and analysis of a business system and data resources of an enterprise. A server is a device, of a data center, for providing a computing service. The server responds to and processes a service request and is capable of undertaking and assuring a service.

Fast growth of global data center traffic has imposed a challenge on storage, computing, and other capabilities of data centers, resulting in increasingly large-scaled data centers. A data center having 100,000 servers is used as an example. Calculation assumes that each rack accommodates 20 servers. Then, 5000 server racks are needed. Such a large-scaled data center brings new challenges to a network designer in layout and networking of servers and switch devices, fiber distribution management, and energy saving and emission reduction.

In a current system, a server or a switch of a data center includes a laser and a supporting apparatus such as a cooling apparatus, making it difficult for the data center to dissipate heat. As a result, energy consumption stays high. In addition, a large quantity of optical fibers causes problems of difficult fiber distribution and high costs.

SUMMARY

Embodiments of the present invention provide a data center. The data center can resolve problems of high energy consumption, difficult fiber distribution, and high costs.

According to a first aspect, this application provides a data center, where the data center includes a wavelength source, a first optical component, a first communications device, and a second communications device. The first optical component includes a first port, a second port, and a third port. The first communications device includes at least one of a server or a switch, and the second communications device includes at least one of a server or a switch. The wavelength source is configured to generate an N-wavelength laser beam, where N is an integer greater than or equal to 1. The first port of the first optical component is configured to receive an M-wavelength laser beam from the wavelength source, where M is an integer greater than or equal to 1 and less than or equal to N. The second port of the first optical component is configured to send the M-wavelength laser beam to the first communications device, where the M-wavelength laser beam includes at least a first-wavelength laser beam. The second port of the first optical component is further configured to receive a modulated first optical signal from the first communications device, where the modulated first optical signal is a modulated optical signal obtained after the first communications device modulates a service signal onto the first-wavelength laser beam. The third port of the first optical component is configured to send the modulated first optical signal to the second communications device.

An optical carrier of the first communications device in the first aspect of this application is provided by an independent centralized wavelength source, so that a laser can be packaged in a centralized manner and laser packaging costs are reduced. The first communications device does not need to carry a laser or a supporting apparatus of the laser, such as a cooling apparatus of the laser, and using the independent wavelength source implements centralized heat dissipation. In this way, a solution for heat dissipation of the first communications device is found, and system energy consumption can be reduced by providing the optical carrier in a centralized manner.

In a possible implementation of the first aspect, the first communications device includes a first port, where the first port of the first communications device is configured to receive the M-wavelength laser beam from the first optical component, and the first port of the first communications device is further configured to send the modulated first optical signal to the first optical component. The first port of the first communications device can not only receive a signal but also send a signal, and requires only one optical fiber to be connected to the second port of the first optical component. Therefore, device cabling can be simplified and costs are reduced.

In another possible implementation of the first aspect, the first communications device includes a second optical component and a first server, and the second optical component includes a first port and a second port. The first port of the second optical component is configured to receive the M-wavelength laser beam from the first optical component. The second port of the second optical component is configured to send the first-wavelength laser beam to the first server. The first server is configured to modulate the service signal onto the first-wavelength laser beam, to obtain the modulated first optical signal, and send the modulated first optical signal to the second optical component. The second port of the second optical component is further configured to receive the modulated first optical signal from the first server. The first port of the second optical component is further configured to send the modulated first optical signal to the first optical component. The second port of the second optical component of the first communications device can not only send a signal but also receive a signal, and requires only one optical fiber to be connected to the first server. Therefore, device cabling can be simplified and costs are reduced.

In another possible implementation of the first aspect, the first server includes a first port, where the first port of the first server is configured to receive the first-wavelength laser beam from the second optical component, and the first port of the first server is further configured to send the modulated first optical signal to the second optical component.

In another possible implementation of the first aspect, the first server includes a third optical component and a first modulator, and the third optical component includes a first port, a second port, and a third port. The first port of the third optical component is configured to receive the first-wavelength laser beam from the second optical component. The second port of the third optical component is configured to send the first-wavelength laser beam to the first modulator. The first modulator is configured to modulate the service signal onto the first-wavelength laser beam, to obtain the modulated first optical signal, and send the modulated first optical signal to the third optical component. The third port of the third optical component is configured to receive the modulated first optical signal from the first modulator. The first port of the third optical component is further configured to send the modulated first optical signal to the second optical component.

In another possible implementation of the first aspect, the first communications device includes a fourth optical component and a first switch, and the fourth optical component includes a first port and a second port. The first port of the fourth optical component is configured to receive the M-wavelength laser beam from the first optical component. The second port of the fourth optical component is configured to send the first-wavelength laser beam to the first switch; the first switch is configured to modulate the service signal onto the first-wavelength laser beam, to obtain the modulated first optical signal, and send the modulated first optical signal to the fourth optical component. The second port of the fourth optical component is further configured to receive the modulated first optical signal from the first switch. The first port of the fourth optical component is further configured to send the modulated first optical signal to the first optical component.

In another possible implementation of the first aspect, the first switch includes a first port, where the first port of the first switch is configured to receive the first-wavelength laser beam from the fourth optical component, and the first port of the first switch is further configured to send the modulated first optical signal to the fourth optical component.

In another possible implementation of the first aspect, the first switch includes a fifth optical component and a second modulator, and the fifth optical component includes a first port, a second port, and a third port. The first port of the fifth optical component is configured to receive the first-wavelength laser beam from the fourth optical component. The second port of the fifth optical component is configured to send the first-wavelength laser beam to the second modulator. The second modulator is configured to modulate the service signal onto the first-wavelength laser beam, to obtain the modulated first optical signal, and send the modulated first optical signal to the fifth optical component. The third port of the fifth optical component is configured to receive the modulated first optical signal from the second modulator; and the first port of the fifth optical component is further configured to send the modulated first optical signal to the fourth optical component.

In another possible implementation of the first aspect, the data center further includes a sixth optical component, and the sixth optical component includes a first port, a second port, and a third port. The first port of the sixth optical component is configured to receive an O-wavelength laser beam from the wavelength source, where O is an integer greater than or equal to 1 and less than or equal to N. The second port of the sixth optical component is configured to send the O-wavelength laser beam to the second communications device, where the O-wavelength laser beam includes at least the first-wavelength laser beam. The second communications device is configured to receive the O-wavelength laser beam, modulate a service signal onto the first-wavelength laser beam, to obtain a modulated first optical signal, and send the modulated first optical signal to the second port of the sixth optical component. The third port of the sixth optical component is configured to send the modulated first optical signal to the first communications device.

In another possible implementation of the first aspect, the data center further includes a seventh optical component and a third communications device, the seventh optical component includes a first port, a second port, and a third port, and the third communications device includes at least one of a server or a switch. The first port of the seventh optical component is configured to receive a P-wavelength laser beam from the wavelength source, where P is an integer greater than or equal to 1 and less than or equal to N. The second port of the seventh optical component is configured to send the P-wavelength laser beam to the third communications device, where the P-wavelength laser beam includes at least the first-wavelength laser beam. The third communications device is configured to receive the P-wavelength laser beam, modulate a service signal onto the first-wavelength laser beam, to obtain a modulated first optical signal, and send the modulated first optical signal to the second port of the seventh optical component. The third port of the seventh optical component is configured to send the modulated first optical signal to the second communications device.

In another possible implementation of the first aspect, the data center further includes an eighth optical component and a third communications device, the eighth optical component includes a first port, a second port, and a third port, and the third communications device includes at least one of a server or a switch. The first port of the eighth optical component is configured to receive a Q-wavelength laser beam from the wavelength source, where Q is an integer greater than or equal to 1 and less than or equal to N. The second port of the eighth optical component is configured to send the Q-wavelength laser beam to the second communications device, where the Q-wavelength laser beam includes at least the first-wavelength laser beam. The second communications device is configured to receive the Q-wavelength laser beam, modulate a service signal onto the first-wavelength laser beam, to obtain a modulated first optical signal, and send the modulated first optical signal to the second port of the eighth optical component. The third port of the eighth optical component is configured to send the modulated first optical signal to the third communications device.

In another possible implementation of the first aspect, the first optical component is a circulator.

In another possible implementation of the first aspect, the second optical component is an arrayed waveguide grating.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
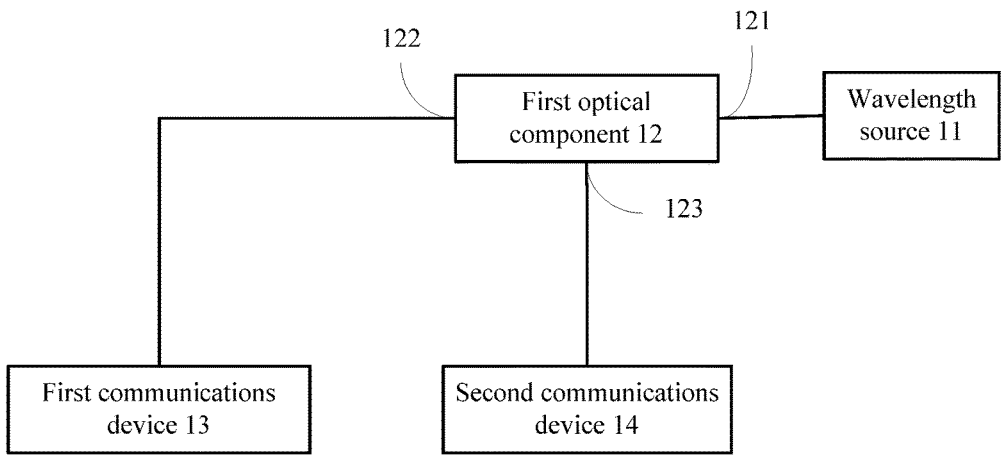
FIG. 1 is a schematic structural diagram of a data center.

FIG. 1 is a data center according to an embodiment of the present invention. The data center includes a wavelength source 11, a first optical component 12, a first communications device 13, and a second communications device 14. The first optical component 12 includes a first port 121, a second port 122, and a third port 123. The first communications device includes at least one of a server or a switch. The second communications device includes at least one of a server or a switch.

The wavelength source 11 is configured to generate an N-wavelength laser beam, where N is an integer greater than or equal to 1.

The first port 121 of the first optical component is configured to receive an M-wavelength laser beam from the wavelength source, where M is an integer greater than or equal to 1 and less than or equal to N.

The second port 122 of the first optical component is configured to send the M-wavelength laser beam to the first communications device 13, where the M-wavelength laser beam includes at least a first-wavelength laser beam.

The second port 122 of the first optical component is further configured to receive a modulated first optical signal from the first communications device, where the modulated first optical signal is a modulated optical signal obtained after the first communications device modulates a service signal onto the first-wavelength laser beam.

The third port 123 of the first optical component is configured to send the modulated first optical signal to the second communications device 14.

In this embodiment of the present invention, the wavelength source in the data center is separated from a server and a switch. In other words, an optical carrier of the first communications device is provided by an independent centralized wavelength source, so that a laser can be packaged in a centralized manner and laser packaging costs are reduced. The first communications device does not need to carry a laser or a supporting apparatus of the laser, such as a cooling apparatus of the laser, and using the independent wavelength source implements centralized heat dissipation. In this way, a solution for heat dissipation of the first communications device is found, and system energy consumption can be reduced by providing the optical carrier in a centralized manner. An optical carrier sent by the first optical component to the first communications device includes an M-wavelength laser beam, which means that a WDM technology is used. The optical carrier may be sent to the first communications device using one optical fiber, reducing a quantity of optical fibers between the first communications device and the second communications device, and reducing complexity of fiber distribution.

Figure 2A:
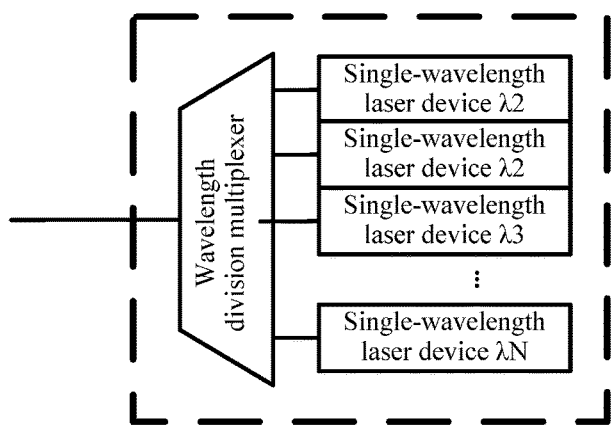
FIG. 2a is a schematic structural diagram of a wavelength source.
Figure 2B:
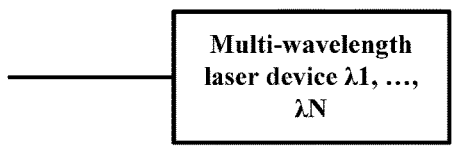
FIG. 2b is a schematic structural diagram of another wavelength source.

The wavelength source 11 is configured to generate the N-wavelength laser beam, and the wavelength source 11 may include a multi-wavelength laser, a plurality of single-wavelength lasers, or a laser in another form. As shown in FIG. 2a, the wavelength source 11 includes N single-wavelength lasers and one wavelength division multiplexer. The wavelength division multiplexer multiplexes laser beams at different wavelengths that are output by the N single-wavelength lasers into one laser beam. As shown in FIG. 2b, the wavelength source 11 includes one multi-wavelength laser. For example, a quantum dot laser (QDL) may be used. A laser beam emitted by the quantum dot laser has a plurality of wavelengths, and no additional wavelength division multiplexer is required to perform multiplexing. In addition, the wavelength source may alternatively include a plurality of multi-wavelength lasers with mutually different wavelengths which are then multiplexed into one beam using a wavelength division multiplexer. The wavelength source may alternatively include a combination of a multi-wavelength laser and a single-wavelength laser, or there may be still other alternatives. Details are not further described herein.

Figure 3A:
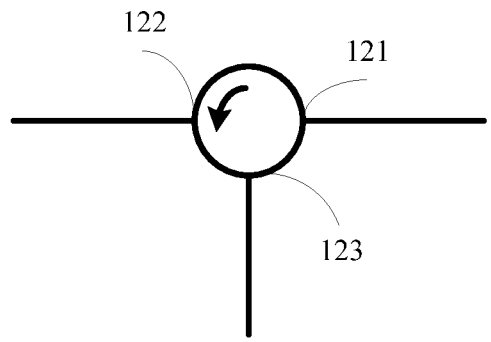
FIG. 3a is a schematic structural diagram of a first optical component.

The first optical component 12 is a multi-port component, for example, a circulator. FIG. 3a is a schematic structural diagram of a first optical component 12. A circulator is provided with three ports: a first port 121, a second port 122, and a third port 123. The circulator is characterized by one-way circulation, and a beam that is input into any one of the ports is transferred, in a given direction, to a next port in the direction. For example, a signal input from the first port 121 is output from the port 122, and therefore the first port 121 may be used to receive an M-wavelength laser beam, and the second port 122 may be used to send the M-wavelength laser beam to the first communications device. A signal input from the port 122 is output from the port 123, and therefore the second port 122 may be used to receive a modulated first optical signal, and the third port 123 may be used to send the modulated first optical signal to the second communications device. FIG. 3a shows a three-port circulator. A four-port circulator or the like may alternatively be used provided that the circulator has three requirement-meeting ports.

Figure 3B:
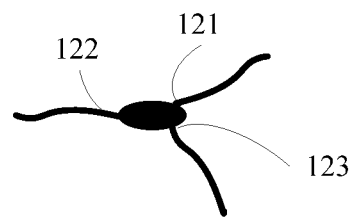
FIG. 3b is a schematic structural diagram of another first optical component.

FIG. 3b is a schematic structural diagram of another first optical component 12. The another first optical component 12 is an optical coupler that receives an M-wavelength laser beam using a first port 121 and sends the M-wavelength laser beam to the first communications device using a second port 122. The another first optical component 12 receives a modulated first optical signal using the second port 122 and sends the modulated first optical signal to the second communications device using a third port 123. It should be noted that a part of the modulated first optical signal that is received using the second port 122 is to leak from the first port 121, and this part of signal cannot be received by the second communications device. The optical coupler causes dissipation of optical energy but costs less than a circulator. Certainly, the first optical component 12 may alternatively be another component provided that three ports of the another component can meet a requirement.

The first communications device 13 may include a first port. The first port of the first communications device 13 is configured to receive the M-wavelength laser beam from the first optical component, and the first port of the first communications device 13 is further configured to send the modulated first optical signal to the first optical component. If a value of M is greater than 1, a wavelength division demultiplexer is required to separate laser beams of different wavelengths for modulation, and a wavelength division multiplexer is also required to combine modulated optical signals of different wavelengths, so that a combined optical signal is sent to the first optical component using the first port.

Figure 4A:
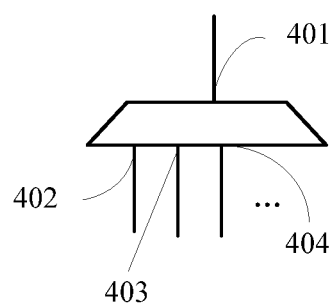
FIG. 4a is a schematic structural diagram of a wavelength division multiplexer/demultiplexer.

FIG. 4a is a structural diagram of a wavelength division multiplexer/demultiplexer. The wavelength division multiplexer/demultiplexer is provided with a first port 401 and a second port 402, and may further include a third port 403, a fourth port 404, and so on. The first port 401 receives the M-wavelength laser beam from the first optical component. The M-wavelength laser beam is demultiplexed. A first-wavelength laser beam is output using the second port 402, a second-wavelength laser beam is output using the third port 403, a third-wavelength laser beam is output using the fourth port 404, and so on. Further, a modulated first-wavelength laser beam may be input using the second port 402, a modulated second-wavelength laser beam may be input using the third port 403, a modulated third-wavelength laser beam may be input using the fourth port 404, and so on. Then, these modulated laser beams are multiplexed and sent to the first optical component using the first port 401. The wavelength division multiplexer/demultiplexer in FIG. 4a may be an arrayed waveguide grating.

If the first communications device further includes a server, the first-wavelength laser beam is output using the second port 402 and is sent to the server. The server modulates a service signal onto the first-wavelength laser beam, to obtain a modulated first optical signal, and sends the modulated first optical signal to the second port 402. If the first communications device further includes a switch, the first-wavelength laser beam may alternatively be output using the second port 402 and is sent to the switch. The switch modulates a service signal onto the first-wavelength laser beam, to obtain a modulated first optical signal, and sends the modulated first optical signal to the second port 402.

Figure 4B:
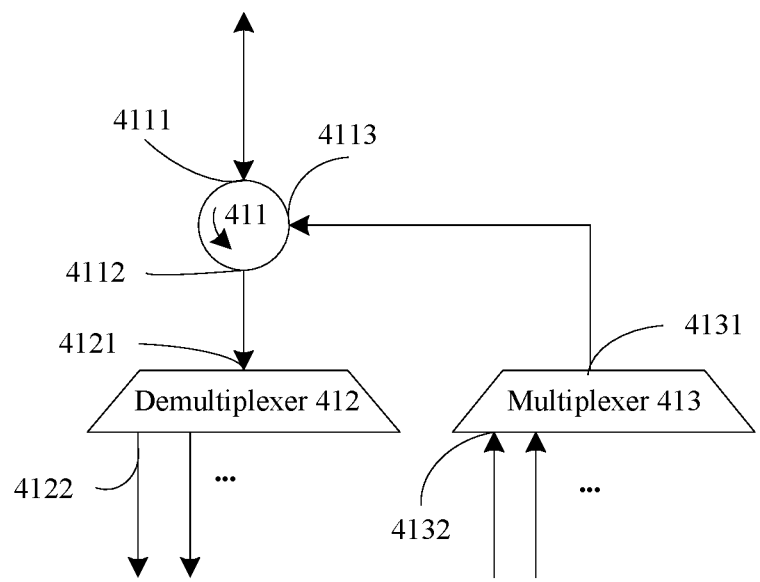
FIG. 4b is a schematic structural diagram of another wavelength division multiplexer/demultiplexer.

FIG. 4b is a structural diagram of a wavelength division multiplexer/demultiplexer, including a circulator 411, a demultiplexer 412, and a multiplexer 413. The circulator 411 includes ports 4111, 4112, and 4113, the demultiplexer 412 includes ports 4121 and 4122, and the multiplexer 413 includes ports 4131 and 4132. The port 4111 of the circulator 411 receives the M-wavelength laser beam from the first optical component. The M-wavelength laser beam is sent to the port 4121 of the demultiplexer 412 using the port 4112. The demultiplexer 412 demultiplexes the M-wavelength laser beam and a first-wavelength laser beam is output using the port 4122. A modulated first-wavelength laser beam is input to the port 4132 of the multiplexer 413. The multiplexer 413 multiplexes the received modulated laser beam, and a multiplexed laser beam is sent to the port 4113 of the circulator 411 using the port 4131 and is then sent to the first optical component using the port 4111.

The wavelength division multiplexer/demultiplexer in FIG. 4b is more complex in structure and costs more than the wavelength division multiplexer/demultiplexer in FIG. 4a. A circulator or a like component may be used to send, to the server or the switch of the first communications device using one optical fiber, the first-wavelength laser beam output by the port 4122 of the demultiplexer 412. The circulator receives, using the same optical fiber, the modulated first optical signal from the server or the switch of the first communications device, and sends the modulated first optical signal to the port 4132 of the multiplexer 413. Using this solution, only one port of the server or the switch of the first communications device needs to be connected to the wavelength division multiplexer/demultiplexer. The port can not only receive the first-wavelength laser beam from the wavelength division multiplexer/demultiplexer, but also send the modulated first optical signal to the wavelength division multiplexer/demultiplexer, so that costs can be reduced. Certainly, the server or the switch of the first communications device may alternatively include two ports. One port is configured to receive the first-wavelength laser beam from the wavelength division multiplexer/demultiplexer, and the other port is configured to send the modulated first optical signal to the wavelength division multiplexer/demultiplexer.

The M-wavelength laser beam received by the first communications device 13 does not carry data information and is generally referred to as an optical carrier. A process of adding a to-be-transmitted service signal onto an optical carrier is referred to as laser modulation, and a modulated laser beam that carries a service signal is generally referred to as a modulated beam.

That the first communications device 13 modulates the service signal onto the first-wavelength laser beam, to obtain the modulated first optical signal may be implemented by a colorless optical sending module. Herein, "colorless" includes two implications. One is that the optical sending module does not include a laser and is only configured to add a to-be-sent service signal onto a laser beam. The other is that, because service signal modulation is insensitive to a wavelength of a to-be-modulated beam, the module does not have an optical wavelength feature, and a wavelength of a modulated optical signal sent completely depends on a wavelength of an input to-be-modulated laser beam. Therefore, blind-mate between the optical module and a wavelength-related component, such as the wavelength division multiplexer/demultiplexer, can be implemented. This feature significantly lowers personnel expertise required for and time costs of system deployment and maintenance. The colorless optical sending module may be implemented in a form shown in FIG. 5a, FIG. 5b, or FIG. 5c. The server or the switch of the first communications device includes one port to receive the optical carrier and send the modulated optical signal. In some embodiments, if the server or the switch of the first communications device includes two ports that are configured to receive the optical carrier and send the modulated optical signal, respectively, the colorless optical sending module may include only one modulator.

Figure 5A:
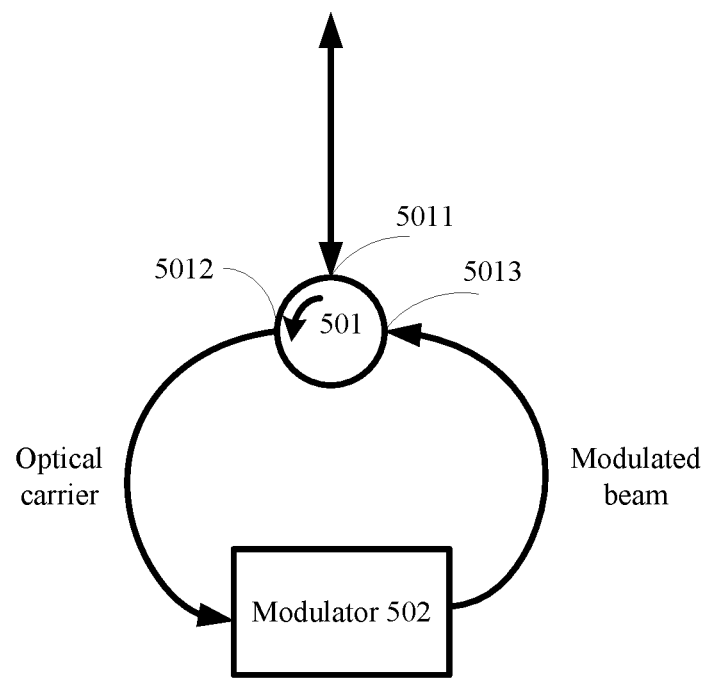
FIG. 5a is a schematic structural diagram of a colorless optical sending module.

FIG. 5a is a schematic structural diagram of a colorless optical sending module, including a circulator 501 and a modulator 502. The circulator 501 is provided with a first port 5011, a second port 5012, and a third port 5013. The first port 5011 of the circulator is configured to receive a first-wavelength laser beam, and the second port 5012 of the circulator is configured to send the first-wavelength laser beam to the modulator 502. The modulator 502 is configured to modulate a service signal onto the first-wavelength laser beam, to obtain a modulated first optical signal, and send the modulated first optical signal to the third port 5013 of the circulator. The third port 5013 of the circulator is configured to receive the modulated first optical signal from the modulator 502. The first port 5011 of the circulator is further configured to send the modulated first optical signal, for example, to the port 402 in FIG. 4a.

Figure 5B:
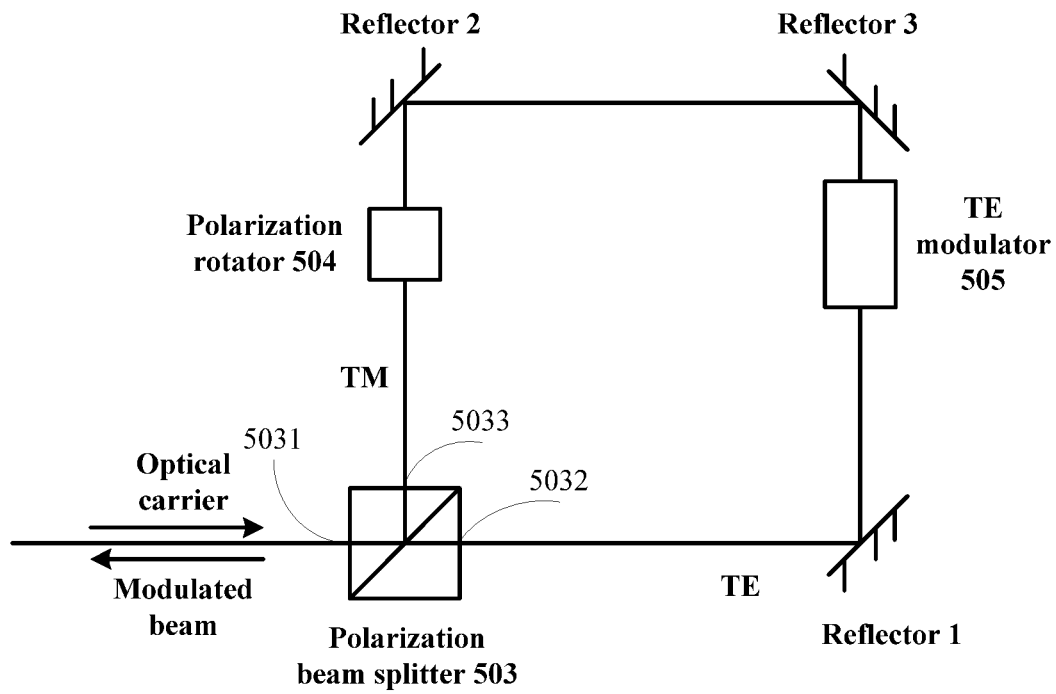
FIG. 5b is a schematic structural diagram of another colorless optical sending module.

FIG. 5b is a schematic structural diagram of another colorless optical sending module, including a polarization beam splitter 503, a polarization rotator 504, a TE modulator 505, and three reflectors: a reflector 1, a reflector 2, and a reflector 3. The polarization beam splitter includes a first port 5031, a second port 5032, and a third port 5033. The first port 5031 receives a first-wavelength laser beam. Generally, the input first-wavelength laser beam is in an arbitrary polarization state. The polarization beam splitter 503 includes two output ports: the second port 5032 and the third port 5033. A beam output by the second port 5032 is in a TE polarization direction, and is transmitted counterclockwise. A beam output by the third port 5033 is in a TM polarization direction, and is transmitted clockwise. The beam transmitted counterclockwise in the TE polarization direction, that is, one part of the first-wavelength laser beam, is reflected by the reflector 1 and is input to the TE modulator 505. A modulated beam, that is, one part of a modulated first optical signal, is reflected by the reflector 3 and the reflector 2, rotated by 90 degrees to the TM polarization direction by the polarization rotator 504, and input to the polarization beam splitter 503 using the third port 5033. The beam transmitted clockwise in the TM polarization director, that is, the other part of the first-wavelength laser beam, is rotated by 90 degrees to the TE polarization direction by the polarization rotator 504, reflected by the reflectors 2 and 3, and input to the TE modulator 505. A modulated beam, that is, the other part of the modulated first optical signal, is reflected by the reflector 1 and is input to the polarization beam splitter 503 by the second port 5032. The polarization beam splitter 503 obtains the modulated first optical signal after combining the modulated beams input by the second port 5032 and the third port 5033, and outputs the modulated first optical signal using the first port 5031.

Figure 5C:
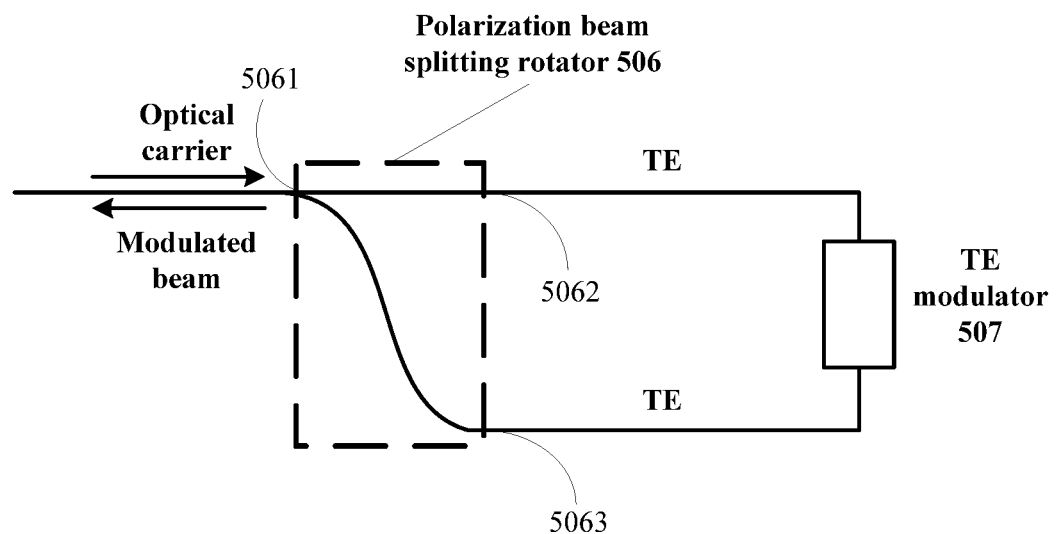
FIG. 5c is a schematic structural diagram of still another colorless optical sending module.

FIG. 5c is a schematic structural diagram of still another colorless optical sending module, including a polarization beam splitting rotator 506 and a TE modulator 507. The polarization beam splitting rotator includes a first port 5061, a second port 5062, and a third port 5063. The first port 5061 receives a first-wavelength laser beam. Generally, the input first-wavelength laser beam is in an arbitrary polarization state. The polarization beam splitting rotator 506 includes two output ports: the second port 5062 and the third port 5063. The polarization beam splitting rotator 506 splits a signal input by the first port 5061 into beams in two polarization directions and rotates a beam in a TM polarization direction to a beam in a TE polarization direction. Therefore, beams output by the second port 5062 and the third port 5063 are in the TE polarization direction. The TE optical carrier output by the second port 5062 is input to the third port 5063 after being modulated by the TE modulator 507, and the TE optical carrier output by the third port 5063 is input to the second port 5062 after being modulated by the TE modulator 507. The polarization beam splitting rotator 506 combines the modulated beams input by the second port 5062 and the third port 5063, and then outputs a combined modulated beam using the first port 5061.

Figure 6A:
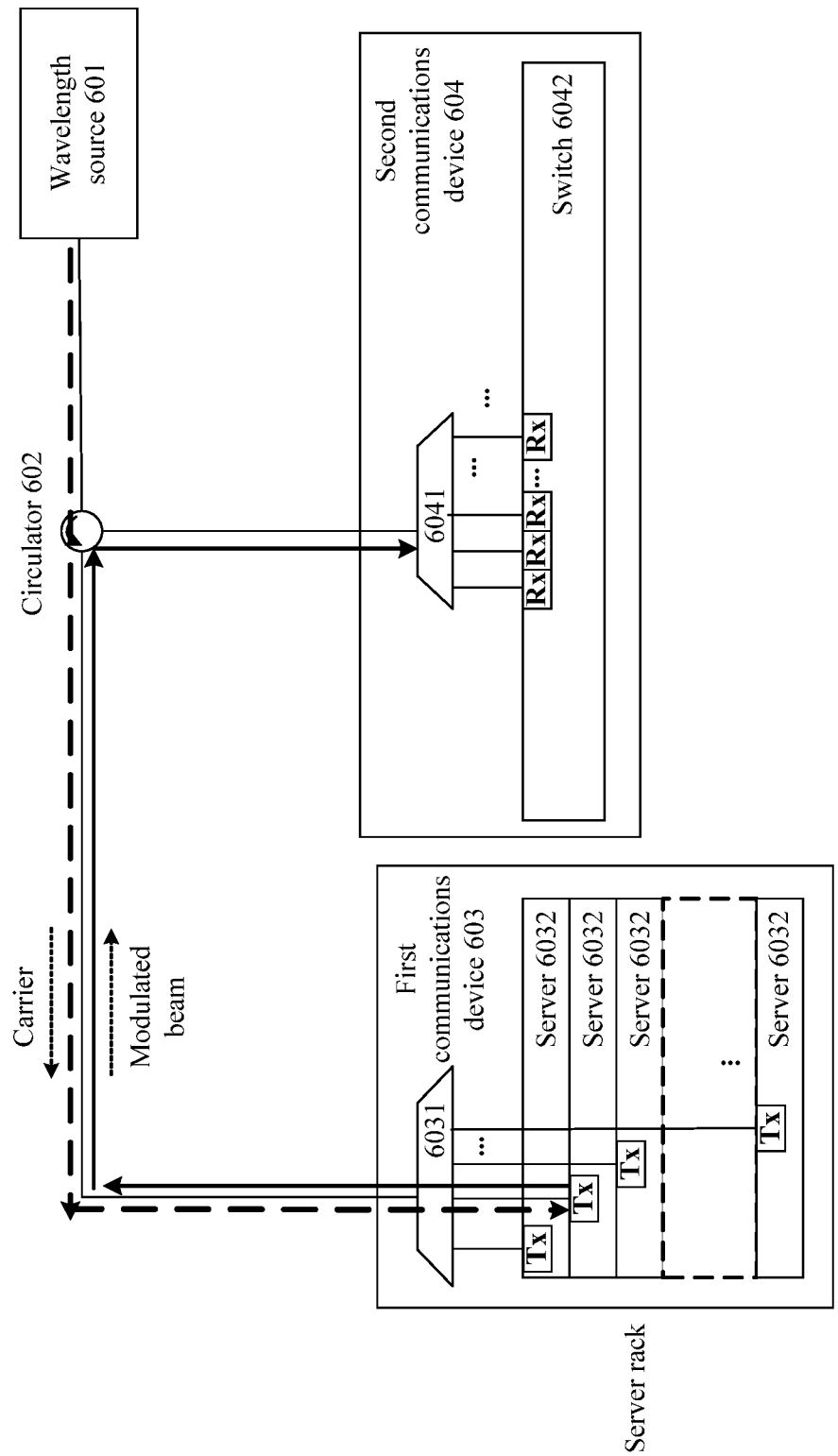
FIG. 6a is a schematic structural diagram of another data center.

FIG. 6a is another data center according to an embodiment of the present invention. The another data center includes a wavelength source 601, a circulator 602, a first communications device 603, and a second communications device 604. Specifically, the first communications device includes a wavelength division multiplexer/demultiplexer 6031 and a server rack. The wavelength division multiplexer/demultiplexer 6031 may be the wavelength division multiplexer/demultiplexer in FIG. 4a, and the server rack includes a plurality of servers 6032, for example, 20 servers 6032. Each server includes a colorless optical sending module, configured to modulate an optical carrier from the wavelength source and send a modulated optical carrier to the second communications device. The second communications device includes a wavelength division demultiplexer 6041 and a switch 6042. FIG. 6a includes a bold dashed line, representing that the optical carrier generated by the wavelength source 601 passes through the circulator and is then sent to the wavelength division multiplexer/demultiplexer 6031, and after demultiplexing is performed, a first-wavelength laser beam is sent to a second server 6032 in the server rack. The second server 6032 modulates to-be-sent data onto the first-wavelength laser beam, to obtain a modulated first optical signal. FIG. 6a further includes a bold solid line, representing that the modulated first optical signal is sent to the wavelength division multiplexer/demultiplexer 6031, and is sent, by the circulator 602 after the modulated first optical signal and a modulated beam from another server are multiplexed, to the second communications device for reception. Specifically, the modulated first optical signal may be sent to a receive port of the switch 6042 after demultiplexing is performed by the wavelength division demultiplexer 6041. In this way, data transmission from the server to the switch is implemented.

If one server rack includes 20 servers, the optical carrier sent by the circulator to the first communications device may include laser beams of 20 wavelengths, to meet a requirement of sending data by the 20 servers to the switch. The first communications device 603 does not need to generate an optical carrier but only needs to receive an optical carrier and modulate a service signal on to the first-wavelength laser beam to obtain the modulated first optical signal, and therefore, may be implemented by a colorless optical sending module. Modulation by a modulator is insensitive to a wavelength of an optical carrier. Therefore, the colorless optical sending module can be mated to any server. In addition, when the colorless optical sending module is connected to a port of the wavelength division multiplexer/demultiplexer, wavelength matching does not need to be considered, so that blind-mate can be achieved. In the current system, when a server carries a light source, wavelength matching needs to be considered for a connection between the server and a wavelength division multiplexer. Otherwise, a severe error is to result. Using the data center in this embodiment of the present invention, a requirement on engineering workers for system deployment is lowered, and system error tolerance can be greatly improved. In addition, requiring no laser, the colorless optical sending module costs less and has a smaller volume and lower power consumption than a common optical sending module. Therefore, device port density and device bandwidth utilization can be improved.

Figure 6B:
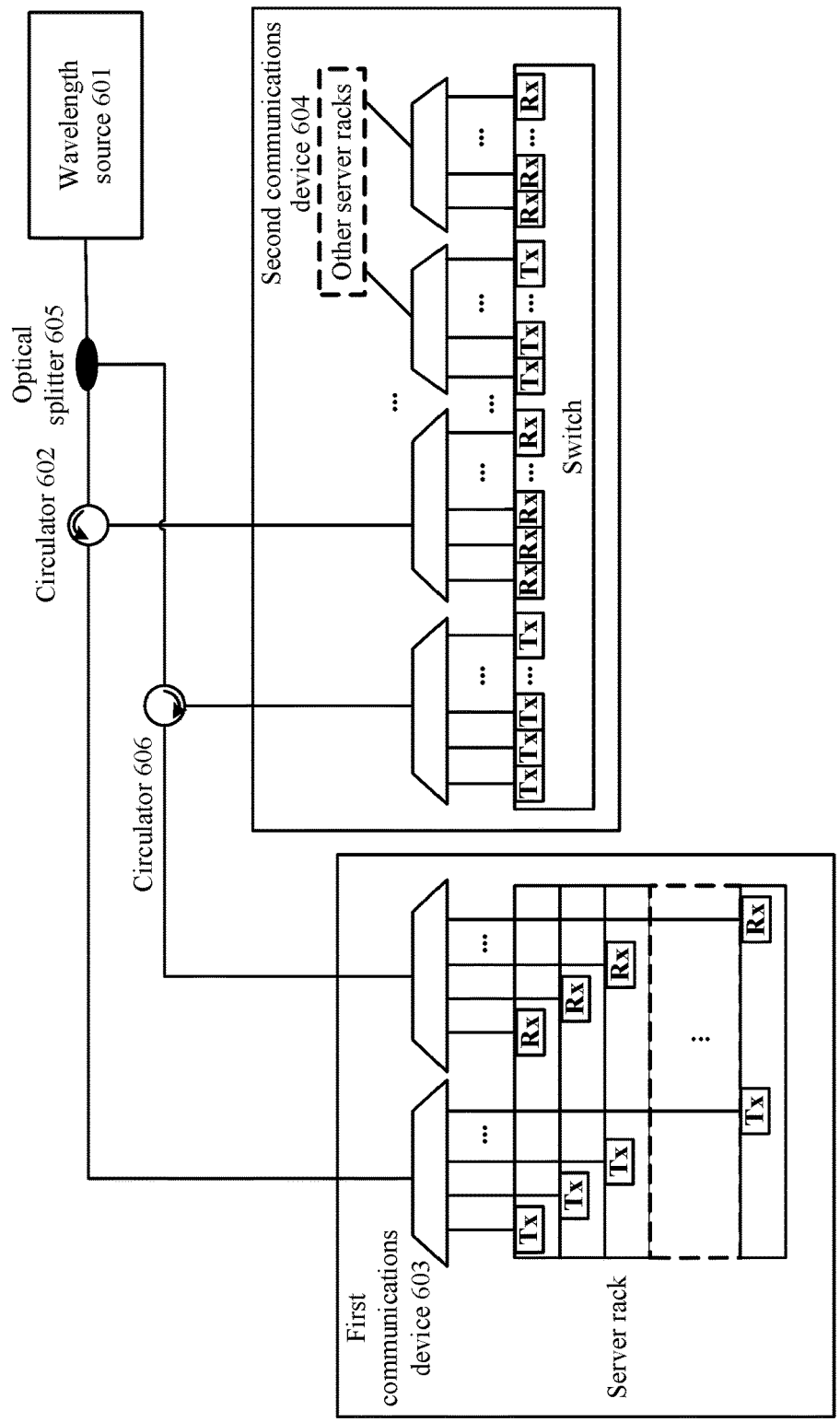
FIG. 6b is a schematic structural diagram of still another data center.

FIG. 6b is still another data center according to an embodiment of the present invention. Compared with that in the embodiment in FIG. 6a, a wavelength source 601 provides an optical carrier for a first communications device 603, to implement data transmission from the first communications device 603 to a second communications device 604, and the wavelength source 601 also provides an optical carrier for the second communications device 604, to implement data transmission from the second communications device 604 to the first communications device 603. The optical carrier output by the wavelength source is divided into two parts after passing through an optical splitter 605. One part is sent to a circulator 602, and the other part is sent to a circulator 606. Generally, wavelengths included in the two parts of the optical carrier are the same. To be specific, a wavelength used by the first communications device 603 to send data to the second communications device 604 may be the same as a wavelength used by the second communications device 604 to send data to the first communications device 603. For example, both parts of the optical carrier include a first-wavelength laser beam. The optical carrier sent to the circulator 606, for example, the first-wavelength laser beam, is sent to the second communications device by a port, of the circulator, that connects to the second communications device. After modulating to-be-sent data on to the optical carrier, the second communications device obtains a modulated beam, for example, a modulated first optical signal; then, the modulated beam is sent to the first communications device using the circulator 606. An entire process is similar to the process of sending data by the first communications device 603 to the second communications device 604 in the embodiment in FIG. 6a. Details are not further described.

In this embodiment of the present invention, the same wavelength source 601 is used by the first communications device 603 to send data to the second communications device 604 and by the second communications device 604 to send data to the first communications device 603. In this way, a quantity of lasers can be reduced so as to reduce costs and further solve heat dissipation and energy consumption of the data center.

Figure 6C:
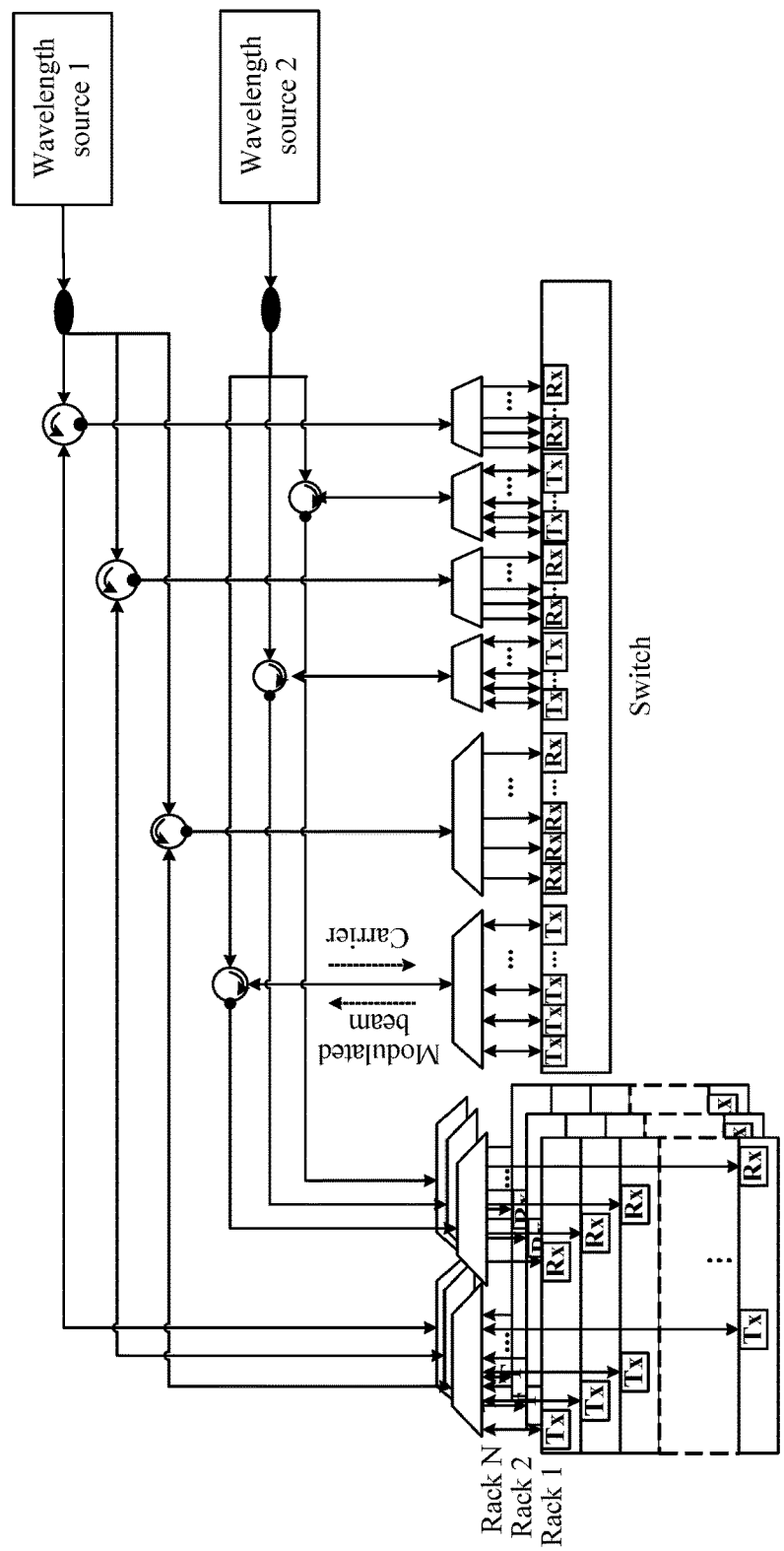
FIG. 6c is a schematic structural diagram of still another data center.

FIG. 6c is still another data center according to an embodiment of the present invention. Compared with that in the embodiment in FIG. 6b, a wavelength source used by a server to send data to a switch is different from a wavelength source used by a switch to send data to a server. An optical carrier provided by a wavelength source 1 is used by the server to send data to the switch, and an optical carrier provided by a wavelength source 2 is used by the switch to send data to the server. The optical carrier provided by the wavelength source 1 is divided into three parts by an optical splitter, and three different server racks are used to provide optical carriers to three different server racks, respectively. The optical carrier provided by the wavelength source 2 is also divided into three parts by an optical splitter, which are provided to the switch using three different circulators, respectively, so that the switch sends service data to three different server racks.

A colorless optical sending module is insensitive to a wavelength. Therefore, the wavelength source in this embodiment of the present invention can be configured more flexibly than in other embodiments.

Figure 6D:
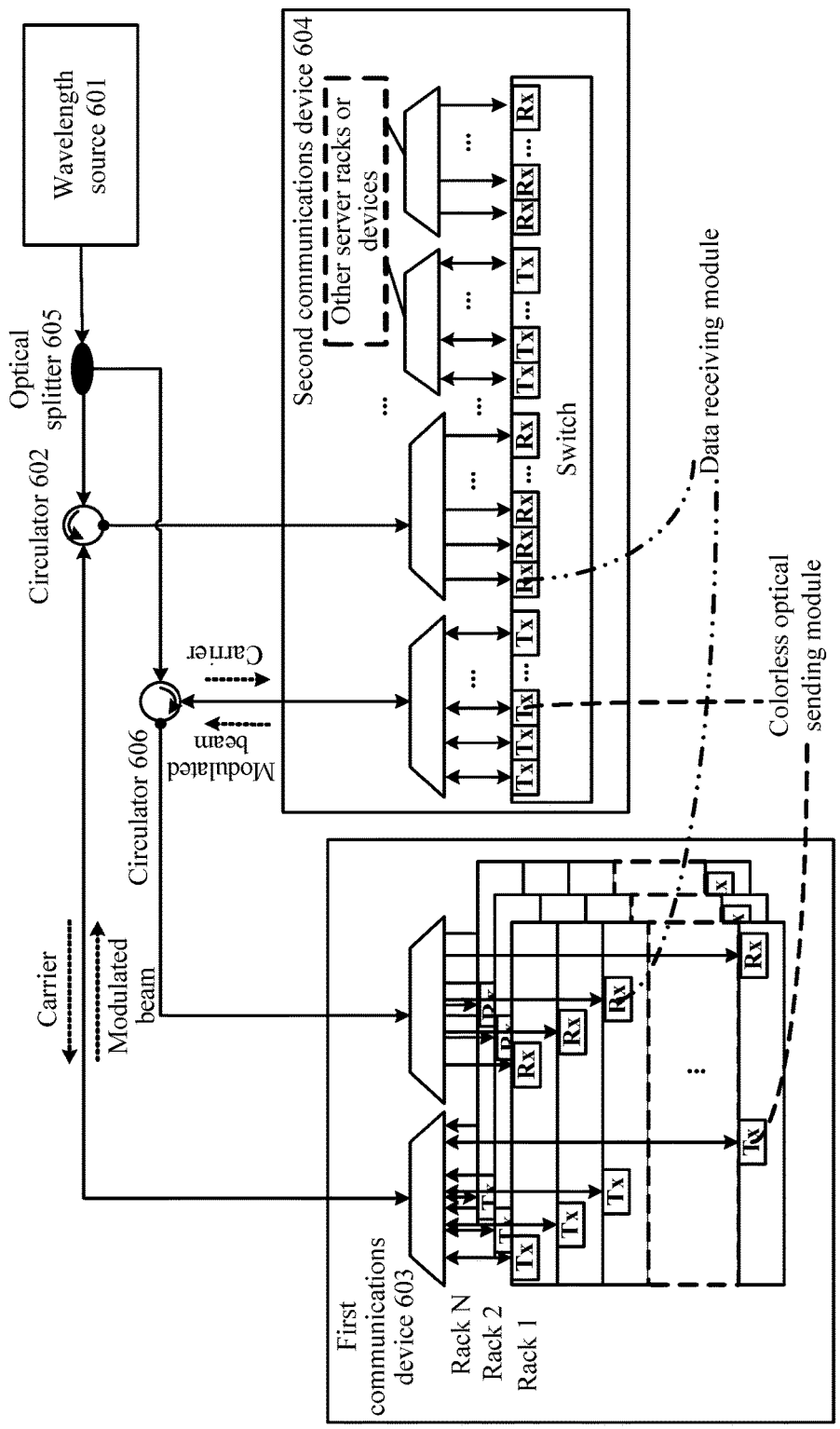
FIG. 6d is a schematic structural diagram of still another data center.

FIG. 6d is still another data center according to an embodiment of the present invention. Compared with that in the embodiment in FIG. 6b, a first communications device includes a plurality of server racks, after an optical carrier from a circulator 602 passes through a wavelength division multiplexer/demultiplexer, different wavelengths are sent to different servers, and these servers may be located at different server racks. It may also be so understood that the servers on the server racks in the foregoing embodiment are logical and may be a combination of servers from a plurality of physical racks.

Figure 6E:
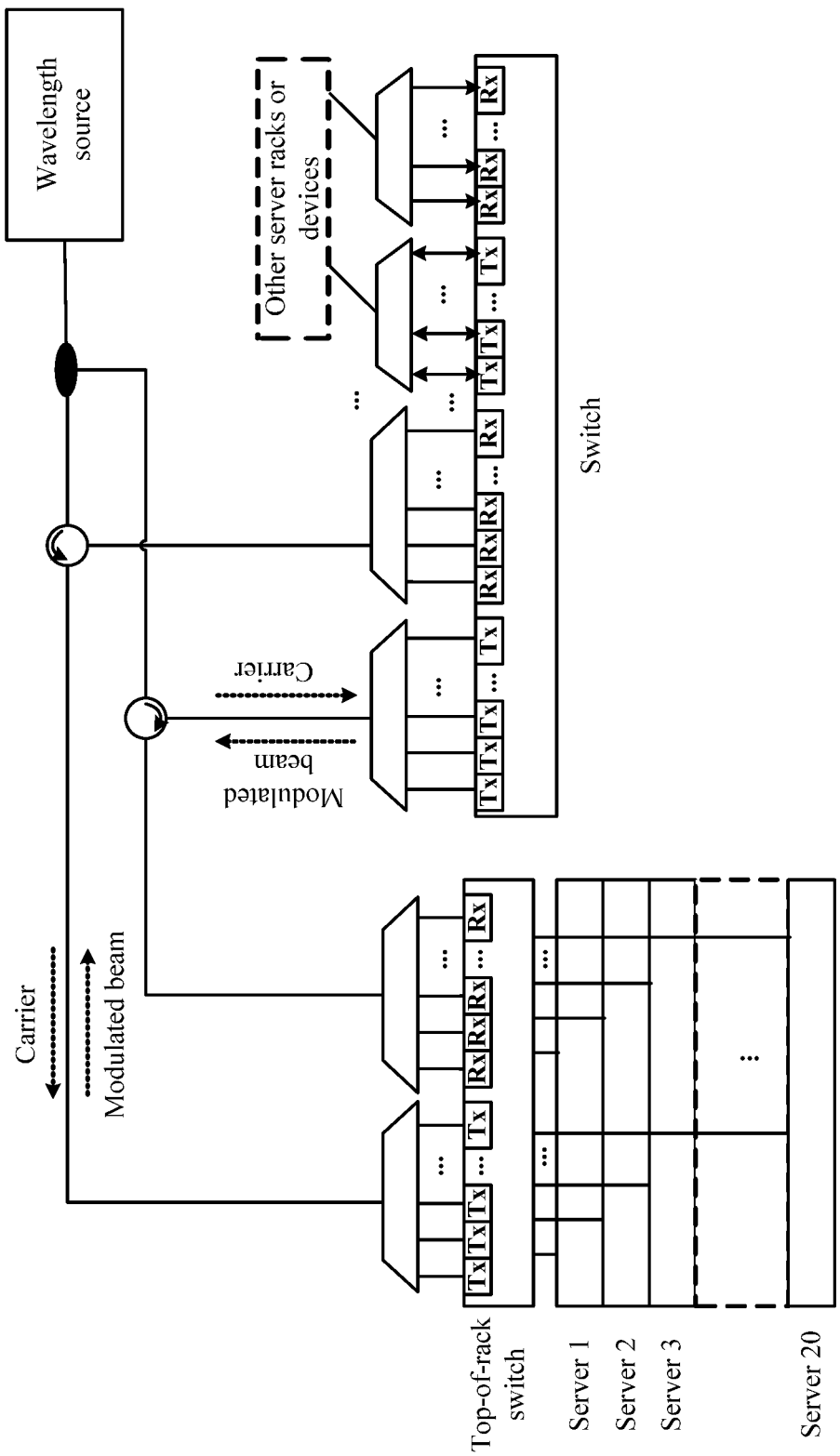
FIG. 6e is a schematic structural diagram of still another data center.

FIG. 6e is still another data center according to an embodiment of the present invention. Compared with that in the embodiment in FIG. 6b, a top-of-rack switch is further included between a server and a wavelength division multiplexer/demultiplexer, a colorless optical sending module is disposed on the top-of-rack switch and is configured to modulate a to-be-sent signal, and a common transceiver module and cable may be used to connect the server and the top-of-rack switch.

Figure 6F:
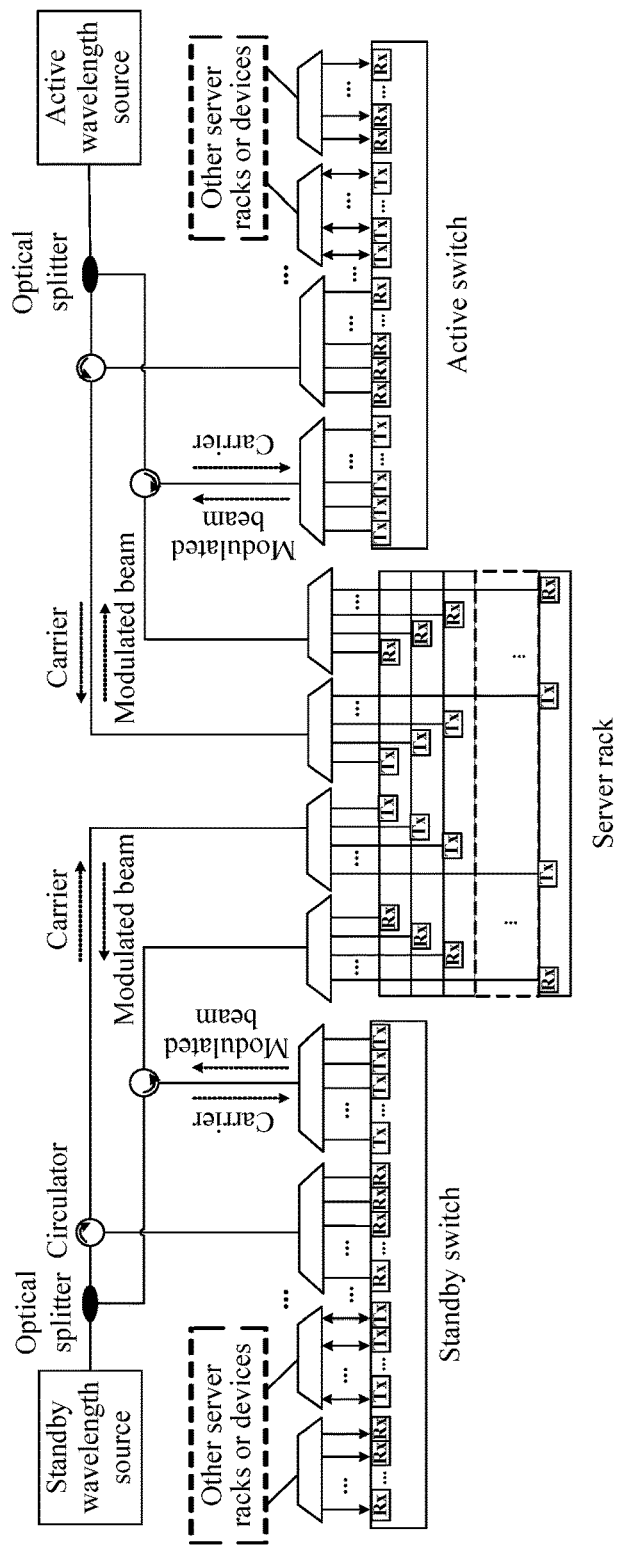
FIG. 6f is a schematic structural diagram of still another data center.

FIG. 6f is still another data center according to an embodiment of the present invention. Compared with the embodiment in FIG. 6b, a standby apparatus is added. When a fault occurs in communication between a server and an active switch, a standby wavelength source may be activated to establish communication between the server and a standby switch.

Figure 6G:
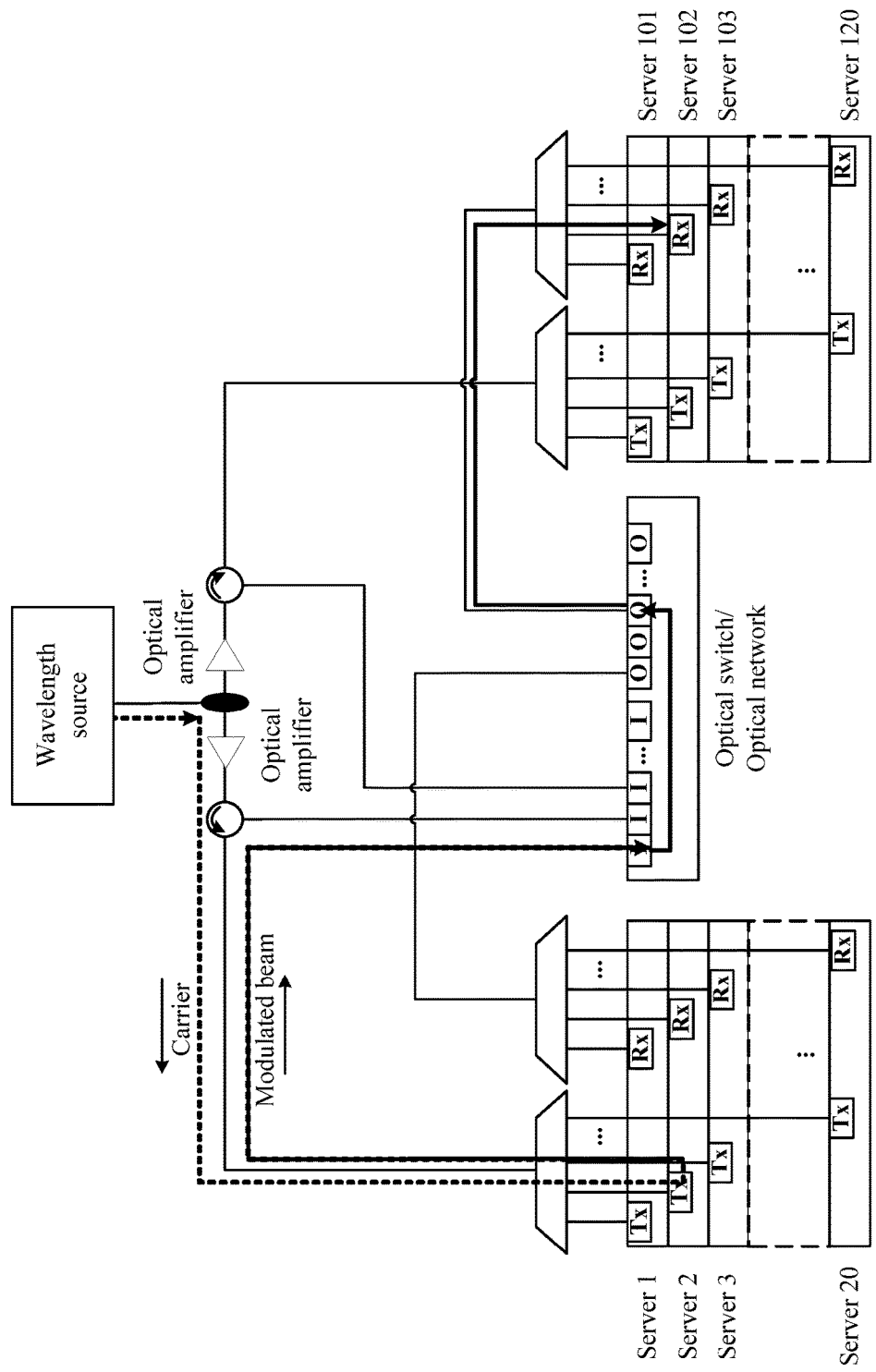
FIG. 6g is a schematic structural diagram of still another data center.

FIG. 6g is still another data center according to an embodiment of the present invention. Compared with that in the embodiment in FIG. 6b, a switch is an optical switch or an optical network. A modulated beam from a server 2 is forwarded to a server 102 by the optical switch or the optical network. As shown in FIG. 6g, to ensure that an optical signal can be successfully received by the server 102, an amplifier may be added to an optical path. As shown by a dashed line arrow in FIG. 6g, after passing through an optical splitter, an optical amplifier, a circulator, and a wavelength division multiplexer/demultiplexer, an optical carrier from a wavelength source is sent to a colorless optical sending module of the server 2 for modulation. A modulated beam is reversely transmitted through a port, the wavelength division multiplexer/demultiplexer, and an optical fiber that are the same as those inputting the optical carrier and is sent to an input port of the optical switch using the circulator. An optical signal from an arbitrary input port can be transmitted to an arbitrary output port using the optical switch without transforming the optical signal to an electrical signal in the process. A modulated beam on which optical switching is performed is output by an output port of the optical switch and is transmitted, after being demultiplexed by a wavelength division demultiplexer on a destination server side, to the destination server 102.

It should be understood that the numbers such as "first", "second", "third", and "fourth" included in this specification are merely for distinguishing purposes for ease of description, and are not intended to limit the scope of the embodiments of the present invention.

It should be understood that sequence numbers of the foregoing processes do not mean execution sequences in the embodiments of the present invention. The execution sequences of the processes should be determined depending on functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be in electronic, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, the functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A data center, comprising:
a wavelength source, configured to generate an N-wavelength laser beam, wherein N is an integer greater than or equal to 1;
a first optical component, comprising a first port, a second port, and a third port;
a first communications device, comprising a first server or a first switch; and
a second communications device, comprising a second server or a second switch;
wherein the first port of the first optical component is configured to receive an M-wavelength laser beam from the wavelength source, wherein M is an integer greater than or equal to 1 and less than or equal to N;
wherein the second port of the first optical component is configured to send the M-wavelength laser beam to the first communications device, wherein the M-wavelength laser beam comprises a first-wavelength laser beam;
wherein the second port of the first optical component is further configured to receive a modulated first optical signal from the first communications device, wherein the modulated first optical signal is obtained by the first communications device by modulating a first service signal onto the first-wavelength laser beam; and
wherein the third port of the first optical component is configured to send the modulated first optical signal to the second communications device.

2. The data center according to claim 1, wherein the first communications device further comprises a first port, wherein the first port of the first communications device is configured to receive the M-wavelength laser beam from the first optical component, and the first port of the first communications device is further configured to send the modulated first optical signal to the first optical component.

3. The data center according to claim 1, wherein the first communications device comprises a second optical component and the first server, and the second optical component comprises a first port and a second port;
wherein the first port of the second optical component is configured to receive the M-wavelength laser beam from the first optical component;
wherein the second port of the second optical component is configured to send the first-wavelength laser beam to the first server;
wherein the first server is configured to modulate the first service signal onto the first-wavelength laser beam to obtain the modulated first optical signal, and to send the modulated first optical signal to the second optical component;
wherein the second port of the second optical component is further configured to receive the modulated first optical signal from the first server; and
wherein the first port of the second optical component is further configured to send the modulated first optical signal to the first optical component.

4. The data center according to claim 3, wherein the second optical component is an arrayed waveguide grating.

5. The data center according to claim 3, wherein the first server comprises a first port, and wherein the first port of the first server is configured to:
receive the first-wavelength laser beam from the second optical component; and
send the modulated first optical signal to the second optical component.

6. The data center according to claim 3, wherein the first server comprises a third optical component and a first modulator, and the third optical component comprises a first port, a second port, and a third port;
wherein the first port of the third optical component is configured to receive the first-wavelength laser beam from the second optical component;

wherein the second port of the third optical component is configured to send the first-wavelength laser beam to the first modulator;

wherein the first modulator is configured to modulate the first service signal onto the first-wavelength laser beam to obtain the modulated first optical signal, and to send the modulated first optical signal to the third optical component;

wherein the third port of the third optical component is configured to receive the modulated first optical signal from the first modulator; and wherein the first port of the third optical component is further configured to send the modulated first optical signal to the second optical component.

7. The data center according to claim 1, wherein the first communications device comprises a fourth optical component and the first switch, and the fourth optical component comprises a first port and a second port;

wherein the first port of the fourth optical component is configured to receive the M-wavelength laser beam from the first optical component;

wherein the second port of the fourth optical component is configured to send the first-wavelength laser beam to the first switch;

wherein the first switch is configured to modulate the first service signal onto the first-wavelength laser beam, to obtain the modulated first optical signal, and send the modulated first optical signal to the fourth optical component;

wherein the second port of the fourth optical component is further configured to receive the modulated first optical signal from the first switch; and wherein the first port of the fourth optical component is further configured to send the modulated first optical signal to the first optical component.

8. The data center according to claim 7, wherein the first switch comprises a first port, wherein the first port of the first switch is configured to receive the first-wavelength laser beam from the fourth optical component, and the first port of the first switch is further configured to send the modulated first optical signal to the fourth optical component.

9. The data center according to claim 7, wherein the first switch comprises a fifth optical component and a second modulator, and the fifth optical component comprises a first port, a second port, and a third port;

wherein the first port of the fifth optical component is configured to receive the first-wavelength laser beam from the fourth optical component;

wherein the second port of the fifth optical component is configured to send the first-wavelength laser beam to the second modulator;

wherein the second modulator is configured to modulate the first service signal onto the first-wavelength laser beam to obtain the modulated first optical signal, and to send the modulated first optical signal to the fifth optical component;

wherein the third port of the fifth optical component is configured to receive the modulated first optical signal from the second modulator; and wherein the first port of the fifth optical component is further configured to send the modulated first optical signal to the fourth optical component.

10. The data center according to claim 1, further comprising a sixth optical component, wherein the sixth optical component comprises a first port, a second port, and a third port;

wherein the first port of the sixth optical component is configured to receive an O-wavelength laser beam from the wavelength source, wherein 0 is an integer greater than or equal to 1 and less than or equal to N;

wherein the second port of the sixth optical component is configured to send the O-wavelength laser beam to the second communications device, wherein the O-wavelength laser beam comprises the first-wavelength laser beam;

wherein the second communications device is configured to receive the O-wavelength laser beam, and to modulate a second service signal onto the first-wavelength laser beam to obtain a modulated second optical signal, and send the modulated second optical signal to the second port of the sixth optical component; and wherein the third port of the sixth optical component is configured to send the modulated second optical signal to the first communications device.

11. The data center according to claim 1, further comprising a seventh optical component and a third communications device, wherein the seventh optical component comprises a first port, a second port, and a third port, and the third communications device comprises a third server or a third switch;

wherein the first port of the seventh optical component is configured to receive a P-wavelength laser beam from the wavelength source, wherein P is an integer greater than or equal to 1 and less than or equal to N;

wherein the second port of the seventh optical component is configured to send the P-wavelength laser beam to the third communications device, wherein the P-wavelength laser beam comprises the first-wavelength laser beam;

wherein the third communications device is configured to receive the P-wavelength laser beam, and to modulate a third service signal onto the first-wavelength laser beam to obtain a modulated third optical signal, and send the modulated third optical signal to the second port of the seventh optical component; and wherein the third port of the seventh optical component is configured to send the modulated third optical signal to the second communications device.

12. The data center according to claim 1, further comprising an eighth optical component and a third communications device, wherein the eighth optical component comprises a first port, a second port, and a third port, and the third communications device comprises a fourth server or a fourth switch;

wherein the first port of the eighth optical component is configured to receive a Q-wavelength laser beam from the wavelength source, wherein Q is an integer greater than or equal to 1 and less than or equal to N;

wherein the second port of the eighth optical component is configured to send the Q-wavelength laser beam to the second communications device, wherein the Q-wavelength laser beam comprises the first-wavelength laser beam;

wherein the second communications device is configured to receive the Q-wavelength laser beam, modulate a fourth service signal onto the first-wavelength laser beam, to obtain a modulated fourth optical signal, and send the modulated fourth optical signal to the second port of the eighth optical component; and wherein the third port of the eighth optical component is configured to send the modulated fourth optical signal to the third communications device.

13. The data center according to claim 1, wherein the first optical component is a circulator.

14. A method, comprising:
   generating, by a wavelength source, an N-wavelength laser beam, wherein N is an integer greater than or equal to 1;
   receiving, by a first port of a first optical component, an M-wavelength laser beam from the wavelength source, wherein M is an integer greater than or equal to 1 and less than or equal to N, and wherein the first optical component comprises the first port, a second port, and a third port;
   sending, by the second port of the first optical component, the M-wavelength laser beam to a first communications device, wherein the M-wavelength laser beam comprises a first-wavelength laser beam, and the first communications device comprises a first server or a first switch;
   receiving, by the second port of the first optical component, a modulated first optical signal from the first communications device, wherein the modulated first optical signal is obtained by the first communications device by modulating a first service signal onto the first-wavelength laser beam; and
   sending, by the third port of the first optical component, the modulated first optical signal to a second communications device, wherein the second communications device, comprises a second server or a second switch.

15. The method according to claim 14, wherein the first communications device further comprises a first port, and the method further comprises:
   receiving, by the first port of the first communications device, the M-wavelength laser beam from the first optical component; and
   sending, by the first port of the first communications device, the modulated first optical signal to the first optical component.

16. The method according to claim 14, wherein the first communications device comprises a second optical component and the first server, and the second optical component comprises a first port and a second port, and the method further comprises:
   receiving, by the first port of the second optical component, the M-wavelength laser beam from the first optical component;
   sending, by the second port of the second optical component, the first-wavelength laser beam to the first server;
   modulating, by the first server, the first service signal onto the first-wavelength laser beam to obtain the modulated first optical signal, and sending the modulated first optical signal to the second optical component;
   receiving, by the second port of the second optical component, the modulated first optical signal from the first server; and
   sending, by the first port of the second optical component, the modulated first optical signal to the first optical component.

17. The method according to claim 16, wherein the second optical component is an arrayed waveguide grating.

18. The method according to claim 16, wherein the first server comprises a first port, and the method further comprises:
   receiving, by the first port of the first server, the first-wavelength laser beam from the second optical component; and
   sending, by the first port of the first server, the modulated first optical signal to the second optical component.

* * * * *